(12) United States Patent
Sato et al.

(10) Patent No.: US 6,558,804 B2
(45) Date of Patent: May 6, 2003

(54) COATING COMPOSITION AND COATED ARTICLE

(75) Inventors: Kazuharu Sato, Gunma-ken (JP); Masaaki Yamaya, Gunma-ken (JP); Mitsuo Asai, Gunma-ken (JP); Kazuyuki Matsumura, Gunma-ken (JP)

(73) Assignee: Shin-Etsu Chemical Co., Ltd., Tokyo (JP)

(*) Notice: Subject to any disclaimer, the term of this patent is extended or adjusted under 35 U.S.C. 154(b) by 0 days.

(21) Appl. No.: 09/919,936

(22) Filed: Aug. 2, 2001

(65) Prior Publication Data

US 2002/0037417 A1 Mar. 28, 2002

(30) Foreign Application Priority Data

Aug. 4, 2000 (JP) ........................................ 2000-237419

(51) Int. Cl.$^7$ ................................................ B32B 9/04
(52) U.S. Cl. ............. 428/447; 106/287.14; 106/287.19; 525/478
(58) Field of Search ...................... 428/447; 106/287.14, 106/287.19; 525/478

(56) References Cited

U.S. PATENT DOCUMENTS

| | | | |
|---|---|---|---|
| 4,701,508 A | 10/1987 | Homma et al. | |
| 4,751,114 A | 6/1988 | Homma et al. | |
| 4,904,525 A | 2/1990 | Taniguchi et al. | |
| 4,940,602 A | 7/1990 | Taniguchi et al. | |
| 5,449,558 A | * 9/1995 | Hasegawa et al. | ........... 428/442 |
| 5,510,406 A | 4/1996 | Matsuo et al. | |
| 6,000,339 A | * 12/1999 | Matsuzawa | ............ 106/287.14 |
| 6,403,223 B1 | * 6/2002 | Albro et al. | ................. 428/421 |

FOREIGN PATENT DOCUMENTS

| | | |
|---|---|---|
| JP | 6140845 | 2/1986 |
| JP | 61258852 | 11/1986 |
| JP | 62185740 | 8/1987 |
| JP | 641527 | 1/1989 |
| JP | 219801 | 1/1990 |
| JP | 4226177 | 8/1992 |
| JP | 4275379 | 9/1992 |
| JP | 10147740 | 6/1998 |
| JP | 2000119634 | 4/2000 |

* cited by examiner

Primary Examiner—Robert Dawson
Assistant Examiner—Christopher M. Keehan
(74) Attorney, Agent, or Firm—Birch, Stewart, Kolasch & Birch, LLP

(57) ABSTRACT

A coating composition comprising a silicone resin having at least two types of fluorinated organic substituent groups and hydroxyl or monovalent hydrolyzable groups forms, through brief curing at low temperature, a uniform transparent coating having a low refractive index (e.g., below 1.42) and a high hardness as well as excellent water repellency, oil repellency, and antifouling property. Stacking the coating on a high refractive index layer results in an antireflection article having an improved reflectance.

21 Claims, No Drawings

COATING COMPOSITION AND COATED ARTICLE

This invention relates to coating compositions from which coatings having a low refractive index and a high hardness as well as water repellency, oil repellency and antifouling property can be briefly formed at low temperatures, and articles having cured coatings of the coating compositions.

BACKGROUND OF THE INVENTION

In the last decades, polymer coatings such as coatings of exterior paint, hard coatings, moisture-proof coatings, and antireflection coatings are required to have various properties such as adhesion to substrates, mar resistance, weather resistance, water repellency, antifouling and low refractive index.

Recently, fluorine-containing polymeric materials become of great interest in a variety of fields including building exterior paint because they are resistant to weathering. It is attempted to increase the proportion of fluorine atoms in such polymeric materials for the purpose of reducing the refractive index thereof.

However, the fluorine-containing polymers are characterized by a solubility parameter which largely differs from that of other organic materials and a weak intermolecular cohesive force. This imposes a limit on the type of solvent which can be used during preparation of polymeric materials. When a coating of polymeric material is formed on a substrate surface, there arise several problems including a low adhesive force to the substrate, a low hardness of the coating, and difficulty to provide sufficient transparency. To solve these problems, several techniques have been proposed.

(a) U.S. Pat. No. 4,701,508, U.S. Pat. No. 4,751,114 discloses a method for preparing a fluorinated polymer having improved adhesion by copolymerizing a fluoroolefin, a vinyl ether and a vinylalkoxysilane.

(b) JP-A 62-185740 discloses a composition comprising a fluoroolefin copolymer having amino and carboxyl groups, an epoxy functional alkoxysilane, and a silanol group-containing compound. This composition has good weather resistance and effective cure.

(c) JP-A 4-275379 discloses an overcoat paint composition for automobiles comprising a fluorinated polymer having hydroxyl and carboxyl groups and a hydrolytic condensate of a metal alkoxide. This composition has improved weather resistance, mar resistance and acid resistance.

(d) JP-A 61-40845 and U.S. Pat. No. 4,904,525, U.S. Pat. No. 4,940,602 disclose a method for preparing an antireflection part utilizing a hydrolyzate of fluorinated alkoxysilane.

(e) JP-A 2-19801 and U.S. Pat. No. 5,510,406 disclose a composition of a polymer having a fluorinated aliphatic ring structure in a solvent, which composition is used as a processing agent to provide low reflection.

(f) JP-A 10-147740 discloses a method of forming a low refractive index coating using a functional group-containing fluoropolymer and a silane compound in the presence of a metal catalyst.

(g) JP-A 2000-119634 discloses the use as an antifouling agent a mixture of hydrolyzates of a fluorinated silane compound and a fluorine-free polyfunctional organosilicon compound.

While a variety of methods as mentioned above are known, the methods disclosed in JP-A 61-258852, JP-A 62-185740 and JP-A 64-1527 suffer from low productivity because coatings as applied must be dried over a long time. Additionally, these coatings have insufficient mar resistance. The methods disclosed in JP-A 61-40845 and JP-A 4-275379 carry out drying treatment at high temperatures, which limit the type of substrate that can be used. In the method disclosed in JP-A 2-19801, the type of solvent that constitutes the composition is limited, and the resulting coating is less mar resistant. JP-A 10-147740 is a complex manufacturing process which increases the cost. The reduction of refractive index is below the expectation. JP-A 64-1527 fails to achieve a fully reduced refractive index and good antireflection effect since a trifluoropropyltrialkoxysilane is used as the fluorinated silane. JP-A 2000-119634 fails to produce a uniform coating since the compounds used are less compatible.

In the prior art, there are known no coating compositions which can effectively form cured coatings satisfying all the desired features of substrate adhesion, mar resistance, weather resistance, water repellency, antifouling, low refractive index and transparency.

SUMMARY OF THE INVENTION

An object of the invention is to provide a coating composition which can effectively form a protective coating having improved substrate adhesion, mar resistance, weather resistance, water repellency, antifouling, low refractive index and transparency.

The invention provides a coating composition comprising a silicone resin having at least two types of fluorinated organic substituent groups, represented by the following average compositional formula (1).

$$R^1_m R^2_n R^3_p SiX_q O_{(4-m-n-p-q)/2} \quad (1)$$

Herein $R^1$ and $R^2$ are different monovalent fluorinated organic groups of 3 to 30 carbon atoms, $R^3$ is hydrogen or a monovalent organic group of 1 to 10 carbon atoms, X is OH or a monovalent hydrolyzable group, m, n, p and q are numbers satisfying $0<m<1$, $0<n<1$, $0\leq p<1$, $0<q<1.8$, $0<m+n\leq 1$, and $0<m+n+p+q\leq 3$. On brief curing at low temperature, the composition forms a uniform transparent coating having a high fluorine content, a low refractive index and a high hardness. The coating has excellent water repellency, oil repellency, and antifouling property. It is possible to reduce the refractive index of the coating to or below 1.42. Stacking the coating on a high refractive index layer having a refractive index of at least 1.65 results in an antireflection article having an improved reflectance.

DESCRIPTION OF THE PREFERRED EMBODIMENT

The coating composition of the invention contains a silicone resin having at least two types of fluorinated organic substituent groups. The silicone resin is represented by the following average compositional formula (1):

$$R^1_m R^2_n R^3_p SiX_q O_{(4-m-n-p-q)/2} \quad (1)$$

wherein $R^1$ and $R^2$ are different monovalent fluorinated organic groups of 3 to 30 carbon atoms, $R^3$ is hydrogen or a monovalent organic group of 1 to 10 carbon atoms, X is OH or a monovalent hydrolyzable group, m, n, p and q are numbers satisfying $0<m<1$, $0<n<1$, $0\leq p<1$, $0<q<1.8$, $0<m+n\leq 1$, and $0<m+n+p+q\leq 3$.

The silicone resin is obtained by hydrolysis or hydrolysis and partial condensation of a mixture of components (1) to (3):

(1) 100 parts by weight of a fluorinated silane compound of the following formula (1a):

$$R^1R^3_aSiY_{3-a} \quad (1a)$$

or a (partial) hydrolyzate or condensate thereof, (2) 1 to 1,000 parts by weight of a fluorinated silane compound of the following formula (1b):

$$R^2R^3_bSiY_{3-b} \quad (1b)$$

or a (partial) hydrolyzate or condensate thereof, and (3) 0 to 1,000 parts by weight of a fluorine-free silane compound of the following formula (1c):

$$R^3_cSiY_{4-c} \quad (1c)$$

or a (partial) hydrolyzate or condensate thereof. In the formulae, $R^1$, $R^2$ and $R^3$ are as defined above, Y is OH or a monovalent hydrolyzable group, "a" is a number from 0 to 2, "b" is a number from 0 to 2, and "c" is a number from 0 to 3.

The monovalent fluorinated organic groups of 3 to 30 carbon atoms represented by $R^1$ and $R^2$ typically have the following formula.

$$Rf(CH_2)_rZ(CH_2)_s-$$

Herein Rf is $C_xF_{2x+1}$ or a polyfluoroalkyl group which may contain at least one ether bond, represented by the formula:

$$CF_3CF_2CF_2O(\underset{\underset{CF_3}{|}}{C}FCF_2O)_y\underset{\underset{CF_3}{|}}{C}F-$$

wherein x is an integer of 1 to 20, and y is an integer of at least 1, preferably 1 to 20, and more preferably 1 to 10. Z is one or more linking groups selected from among —CH$_2$—, —CH$_2$O—, —NR—, —COO—, —CONR—, —S—, —SO$_3$— or —SO$_2$NR—, wherein R is hydrogen or an alkyl group of 1 to 8 carbon atoms. The letter r is an integer of 0 to 3 and s is an integer of 1 to 3.

$R^1$ differs from $R^2$. It is preferred that $R^1$ be 3,3,3-trifluoropropyl and $R^2$ be a different fluorinated organic group.

$R^3$ is hydrogen or a monovalent organic group of 1 to 10 carbon atoms. Included are unsubstituted monovalent organic groups, for example, alkyl groups such as methyl, ethyl, propyl, butyl, hexyl, octyl and decyl, alkenyl groups such as vinyl, allyl, propenyl, butenyl, and hexenyl, aryl groups such as phenyl, tolyl and xylyl, and aralkyl groups such as benzyl; and substituted groups in which some of the hydrogen atoms on the foregoing groups are substituted with acryloxy, methacryloxy, mercapto, epoxy, amino and alkylamino groups.

Where it is desired that the silicone resin be curable with ultraviolet radiation, at least some of $R^3$ are preferably 3-acryloxypropyl or 3-methacryloxypropyl.

X is OH or a monovalent hydrolyzable group, examples of which include alkoxy, acetoxy, alkenoxy groups and chlorine atoms. Of these, alkoxy groups, especially alkoxy groups having 1 to 4 carbon atoms are preferred.

In formula (1), m, n, p and q are numbers satisfying 0<m<1, 0<n<1, 0≦p<1, 0<q<1.8, 0<m+n≦1, and 0<m+n+p+q≦3; preferably 0.05≦m≦0.95, 0.05≦n≦0.90, 0≦p≦0.90, and 0.1≦m+n+p+q≦2.75; and more preferably 0.05≦m≦0.80, 0.05≦n≦0.60, 0≦p≦0.50, and 0.1≦m+n+p+q≦1.9.

Rf is $C_xF_{2x+1}$ or $CF_3CF_2CF_2O(CFCF_3CF_2O)_yCFCF_3$— wherein x and y are as defined above. Examples of $C_xF_{2x+1}$ include CF$_3$—, C$_2$F$_5$—, C$_3$F$_7$—, C$_4$F$_9$—, C$_6$F$_{13}$—, C$_8$F$_{17}$—, C$_{10}$F$_{21}$—, C$_{12}$F$_{25}$—, C$_{14}$F$_{29}$—, C$_{16}$F$_{33}$—, C$_{18}$F$_{37}$—, and C$_{20}$F$_{41}$—.

Illustrative, non-limiting, examples of the silane compounds of the above formulae (1a) and (1b) are given below.

Rf(CH$_2$)$_2$Si(OH)$_3$
Rf(CH$_2$)$_2$SiCH$_3$(OH)$_2$
Rf(CH$_2$)$_2$Si(OCH$_3$)(OH)$_2$
Rf(CH$_2$)$_2$Si(OCH$_2$CH$_3$)(OH)$_2$
Rf(CH$_2$)$_2$Si(CH$_3$)$_2$(OH)
Rf(CH$_2$)$_2$Si(OCH$_3$)$_2$(OH)
Rf(CH$_2$)$_2$Si(OCH$_2$CH$_3$)$_2$(OH)
Rf(CH$_2$)$_3$Si(OH)$_3$
Rf(CH$_2$)$_3$SiCH$_3$(OH)$_2$
Rf(CH$_2$)$_3$Si(OCH$_3$)(OH)$_2$
Rf(CH$_2$)$_3$Si(OCH$_2$CH$_3$)(OH)$_2$
Rf(CH$_2$)$_3$Si(CH$_3$)$_2$(OH)
Rf(CH$_2$)$_3$Si(OCH$_3$)$_2$(OH)
Rf(CH$_2$)$_3$Si(OCH$_2$CH$_3$)$_2$(OH)
RfNH(CH$_2$)$_2$Si(OH)$_3$
RfNH(CH$_2$)$_2$SiCH$_3$(OH)$_2$
RfNH(CH$_2$)$_2$Si(OCH$_3$)(OH)$_2$
RfNH(CH$_2$)$_2$Si(OCH$_2$CH$_3$)(OH)$_2$
RfNH(CH$_2$)$_2$Si(CH$_3$)$_2$(OH)
RfNH(CH$_2$)$_2$Si(OCH$_3$)$_2$(OH)
RfNH(CH$_2$)$_2$Si(OCH$_2$CH$_3$)$_2$(OH)
RfNH(CH$_2$)$_2$NH(CH$_2$)$_2$Si(OH)$_3$
RfNH(CH$_2$)$_2$NH(CH$_2$)$_2$SiCH$_3$(OH)$_2$
RfNH(CH$_2$)$_2$NH(CH$_2$)$_2$Si(OCH$_3$)(OH)$_2$
RfNH(CH$_2$)$_2$NH(CH$_2$)$_2$Si(OCH$_2$CH$_3$)(OH)$_2$
RfNH(CH$_2$)$_2$NH(CH$_2$)$_2$Si(CH$_3$)$_2$(OH)
RfNH(CH$_2$)$_2$NH (CH$_2$)$_2$Si(OCH$_3$)$_2$(OH)
RfNH(CH$_2$)$_2$NH(CH$_2$)$_2$Si(OCH$_2$CH$_3$)$_2$(OH)
RfCONH(CH$_2$)$_2$Si(OH)$_3$
RfCONH(CH$_2$)$_2$SiCH$_3$(OH)$_2$
RfCONH(CH$_2$)$_2$Si(OCH$_3$)(OH)$_2$
RfCONH (CH$_2$)$_2$Si(OCH$_2$CH$_3$)(OH)$_2$
RfCONH(CH$_2$)$_2$Si(CH$_3$)$_2$(OH)
RfCONH(CH$_2$)$_2$Si(OCH$_3$)$_2$(OH)
RfCONH(CH$_2$)$_2$Si(OCH$_2$CH$_3$)$_2$(OH)

Of these, the following are preferred.

CF$_3$(CH$_2$)$_2$Si(OH)$_3$
CF$_3$(CH$_2$)$_2$SiCH$_3$(OH)$_2$
CF$_3$(CH$_2$)$_2$Si(OCH$_3$)(OH)$_2$
CF$_3$(CH$_2$)$_2$Si(CH$_3$)$_2$(OH)
CF$_3$(CH$_2$)$_2$Si(OCH$_3$)$_2$(OH)
C$_8$F$_{17}$(CH$_2$)$_2$Si(OH)$_3$
C$_8$F$_{17}$(CH$_2$)$_2$SiCH$_3$(OH)$_2$
C$_8$F$_{17}$(CH$_2$)$_2$Si (OCH$_3$)(OH)$_2$
C$_8$F$_{17}$(CH$_2$)$_2$Si(CH$_3$)$_2$(OH)
C$_8$F$_{17}$(CH$_2$)$_2$Si(OCH$_3$)$_2$(OH)
C$_3$F$_7$(CF(CF$_3$)CF$_2$O)$_3$CF(CF$_3$)CH$_2$O(CH$_2$)$_3$Si(OH)$_3$
C$_3$F$_7$(CF(CF$_3$)CF$_2$O)$_3$CF(CF$_3$)CH$_2$O(CH$_2$)$_3$SiCH$_3$(OH)$_2$
C$_3$F$_7$(CF(CF$_3$)CF$_2$O)$_3$CF(CF$_3$)CH$_2$O(CH$_2$)$_3$Si(OCH$_3$)(OH)$_2$
C$_3$F$_7$(CF(CF$_3$)CF$_2$O)$_3$CF(CF$_3$)CH$_2$O(CH$_2$)$_3$Si(OCH$_3$)$_2$(OH)

In the practice of the invention, these fluorinated silane compounds are used in admixture because the combined use of two or more types of fluorinated silane compounds which are reactive and highly compatible with each other allows a highly fluorinated silane compound be uniformly incorporated in the system through hydrolysis.

More preferably, one of the fluorinated silane compounds is trifluoropropyltrimethoxysilane and/or trifluoropropyltriethoxysilane.

Examples of the fluorine-free silane compound of formula (1c) having two, three or four hydrolyzable groups which can be used in combination with the above include methyltrimethoxysilane, methyltriethoxysilane, ethyltrimethoxysilane, vinyltrimethoxysilane, phenyltrimethoxysilane, dimethyldimethoxysilane, dimethyldiethoxysilane, dibutyldimethoxysilane, γ-mercaptopropylmethyldimethoxysilane, γ-mercaptopropylmethyldiethoxysilane, γ-mercaptopropyltriethoxysilane, γ-mercaptopropyltrimethoxysilane, tetramethoxysilane, tetraethoxysilane, γ-glycidoxypropylmethyldimethoxysilane, γ-glycidoxypropyltrimethoxysilane, γ-methacryloxypropyltrimethoxysilane, γ-methacryloxypropylmethyldimethoxysilane, γ-acryloxypropyltrimethoxysilane, γ-acryloxypropylmethyldimethoxysilane, 3,4-epoxycyclohexylethyltrimethoxysilane, γ-aminopropyltrimethoxysilane, γ-aminopropyltriethoxysilane, γ-aminopropylmethyldiethoxysilane, γ-aminopropylethyldiethoxysilane, diphenyldimethoxysilane, ρ-styryltrimethoxysilane, and ρ-styrylmethyldimethoxysilane. These fluorine-free silane compounds may be used alone or in admixture of two or more. Of these compounds, methyltrialkoxysilanes and tetraalkoxysilanes such as tetramethoxysilane, tetraethoxysilane, methyltrimethoxysilane and methyltriethoxysilane are especially preferred from the standpoint of improving the mar resistance of cured products. In the UV curing application, silane compounds having epoxy functional groups such as (meth)acrylic functional groups, glycidyl groups and epoxy cyclohexyl groups are preferred.

In the mixture of two types of fluorinated silane compounds, 100 parts by weight of the fluorinated silane compound of formula (1a) is admixed with 1 to 1,000 parts, preferably 30 to 500 parts by weight of the fluorinated silane compound of formula (1b).

With respect to the proportion of the fluorine-free silane compound to the two types of fluorinated silane compounds, 0 to 1,000 parts, preferably 1 to 100 parts by weight of the fluorine-free silane compound of formula (1c) is used per 100 parts by weight of the fluorinated silane compound of formula (1a). If the amount of the fluorine-free silane compound used is very small, a coating composition prepared therefrom gives a coating which may sometimes be less resistant to mar. If the amount of the fluorine-free silane compound used is too large, the resultant cured coating may have a higher refractive index, failing to provide a satisfactory antireflection effect.

For hydrolysis and condensation reaction of the above-described silane compounds, an aqueous solution of an acidic compound is generally used. A catalyst for promoting hydrolysis and condensation is preferably used in combination when fluorinated silane compounds are less reactive. The catalyst used to this end is preferably a metal compound of the general formula (2):

$$M(Q)_w \qquad (2)$$

wherein M is a metal atom such as aluminum, titanium, zirconium, tin or zinc, Q is at least one substituent selected from halogen atoms, hydroxyl, alkoxy, acyloxy, benzoyloxy, perchlorate, β-diketone and β-diketo ester groups, and w is the valence of M.

Illustrative, non-limiting, examples of the metal compound of formula (2) include aluminum chloride, aluminum perchlorate, aluminum hydroxychloride, aluminum triethoxide, aluminum tripropoxide, aluminum isopropoxide, aluminum tributoxide, aluminum trisacetylacetonate, titanium tetramethoxide, titanium tetraethoxide, titanium tetraisopropoxide, titanium tetrabutoxide, zirconium tetramethoxide, zirconium tetraethoxide, zirconium tetraisopropoxide, dibutyl tin dilaurate, dioctyl tin diacetate, and zinc octylate. The metal compounds may be used in admixture of two or more. Of these, aluminum trisacetylacetonate is most preferred because it is advantageous for substrate adhesion, stability and low-temperature cure.

Any desired method may be used to carry out hydrolysis. Typical methods include method (i) involving subjecting a mixture of components (1) to (3) to hydrolysis in the presence of an acidic compound as the hydrolysis catalyst, and adding a metal compound to the hydrolyzed mixture, followed by further hydrolysis or hydrolytic condensation;

method (ii) involving mixing components (1) and (2) with a metal compound, subjecting the mixture to hydrolysis in the presence of an acidic compound, and adding component (3) to the hydrolyzed mixture, followed by further hydrolysis or hydrolytic condensation; and method (iii) involving mixing components (1) to (3) with a metal compound, adding water containing an acidic compound to the mixture, and effecting hydrolysis.

Of these, multi-stage hydrolysis method (i) is preferred because the fluorinated silane compounds can be uniformly incorporated. From a coating composition resulting from the multi-stage hydrolysis method, there is readily obtained a flat uniform coating which is free from a run-away or twist phenomenon.

The multi-stage hydrolysis method (i) which is advantageous in producing the coating composition of the invention is described in more detail. The first stage is to hydrolyze a mixture of 100 parts by weight of the fluorinated silane compound as component (1), 1 to 1,000 parts by weight of the fluorinated silane compound as component (2) and 0 to 1,000 parts by weight of the fluorine-free silane compound as component (3) in an aqueous solution containing an acidic compound such as hydrochloric acid, nitric acid, sulfuric acid or acetic acid as a primary hydrolysis catalyst. Hydrolysis is preferably effected at a temperature in the range of 0 to 60° C., more preferably at a lower temperature within the range. Hydrolysis may be effected in the absence or presence of an organic solvent, preferably in the presence of an organic solvent. Exemplary organic solvents are isobutyl alcohol, diacetone alcohol and propylene glycol monomethyl ether.

The second stage is to complete hydrolysis reaction and uses a hydrolysis catalyst. Specifically, a metal compound of formula (2) is added to the hydrolyzed mixture and hydrolysis is effected as in the first stage. The amount of the metal compound added is preferably about 0.001 to 20 parts, more preferably about 0.01 to 10 parts by weight per 100 parts by weight of components (1) to (3) combined. The amount of water used in hydrolysis is preferably about 0.5 to 10 mol per mol of hydrolyzable silyl groups. An appropriate reaction temperature is in the range of 0 to 60° C.

It is understood that in both methods (ii) and (iii), hydrolysis can be effected under similar conditions to the above.

The coating composition of the invention is defined as comprising the silicone resin of formula (1) although the composition may further include other components. For example, various surfactants are included for the purpose of improving coating characteristics. Copolymers of dimethylpolysiloxane with polyethers and fluorochemical surfactants are especially effective. Also well-known organic UV absorbers such as benzophenone, triazine and benzotriazole UV absorbers, as well as inorganic UV absorbers such as titanium oxide, zinc oxide and zirconium oxide are included for improving weather resistance.

The coating composition of the invention may be curable with UV radiation or electron beams. In order that such radiation curing be utilized, the silicone resin should contain (meth)acryloyl or epoxy groups therein. In one form, the silicone resin having (meth)acryloyl or epoxy groups incorporated therein is used. In another form, a compound having an acryloyl or methacryloyl group (to be referred to as "(meth)acrylate compound," hereinafter) or a compound having an epoxy group (to be referred to as "epoxy compound," hereinafter) is further added for the purpose of tailoring the physical properties such as hardness, adhesion to substrates, and mar resistance of the composition or for the purpose of tailoring the viscosity and curability of the composition.

Illustrative, non-limiting, examples of the (meth)acrylate compound include monofunctional (meth)acrylates such as ethylene oxide-modified phenol (meth)acrylate, propylene oxide-modified phenol (meth)acrylate, ethylene oxide-modified nonylphenol (meth)acrylate, propylene oxide-modified nonylphenol (meth)acrylate, 2-ethylhexylcarbitol (meth)acrylate, isobornyl (meth)acrylate, tetrahydrofurfuryl (meth)acrylate, hydroxyethyl (meth)acrylate, hydroxypropyl (meth)acrylate, hydroxybutyl (meth)acrylate, hydroxyhexyl (meth)acrylate, diethylene glycol mono(meth)acrylate, dipropylene glycol mono(meth)acrylate, triethylene glycol mono(meth)acrylate, and tripropylene glycol mono(meth)acrylate; polyfunctional (meth)acrylates such as diethylene glycol di(meth)acrylate, triethylene glycol di(meth)acrylate, tetraethylene glycol di(meth)acrylate, dipropylene glycol di(meth)acrylate, tripropylene glycol di(meth)acrylate, tetrapropylene glycol di(meth)acrylate, polypropylene glycol di(meth)acrylate, 1,4-butane diol di(meth)acrylate, neopentyl glycol di(meth)acrylate, ethylene oxide-modified neopentyl glycol di(meth)acrylate, ethylene oxide-modified bisphenol A di(meth)acrylate, propylene oxide-modified bisphenol A di(meth)acrylate, ethylene oxide-modified hydrogenated bisphenol A di(meth)acrylate, trimethylol propane di(meth)acrylate, trimethylol propane allyl ether di(meth)acrylate, trimethylol propane tri(meth)acrylate, ethylene oxide-modified trimethylol propane tri(meth)acrylate, propylene oxide-modified trimethylol propane tri(meth)acrylate, pentaerythritol tri(meth)acrylate, pentaerythritol tetra(meth)acrylate, and dipentaerythritol hexaacrylate; polyester acrylates such as Aronix M-6400 (Toagosei Co., Ltd.) and urethane acrylates such as Aronix M-1200 (Toagosei Co., Ltd.).

Also, monofunctional or polyfunctional (meth)acrylate compounds may be used for the purpose of further reducing the refractive index. Examples include $CF_3(CH_2)_2COOCH=CH_2$, $C_3F_7(CH_2)_2COOCH=CH_2$, $C_6F_{13}(CH_2)_2COOCH=CH_2$, $C_8F_{17}(CH_2)_2COOCH=CH_2$, $CF_3(CH_2)_2COO(CH_3)=CH_2$, $C_3F_7(CH_2)_2COO(CH_3)=CH_2$, $C_6F_{13}(CH_2)_2COO(CH_3)=CH_2$, $C_8F_{17}(CH_2)_2COO(CH_3)=CH_2$, $CH_2=CHCOO(CH_2)_2C_6F_{12}(CH_2)_2COOCH=CH_2$, and $CH_2=CHCOO(CH_2)_2C_8F_{16}(CH_2)_2COOCH=CH_2$.

Representative of the epoxy compound are diglycidyl ether and diglycidyl ether of bisphenol A.

An appropriate amount of the (meth)acrylate compound or epoxy compound is about 5 to 1,000 parts, more preferably about 10 to 300 parts by weight per 100 parts by weight of the silicone resin although the addition amount varies with a particular purpose of application and is not critical.

It is also recommended to add a photo-polymerization initiator to the system so that the system becomes capable of photo-polymerization. The photo-polymerization initiators which can be used herein include aryl ketone photo-polymerization initiators (e.g., acetophenone, benzophenone, alkylaminobenzophenone, benzyl, benzoin, benzoin ether, benzyl dimethyl ketal, benzoyl benzoate and α-acyloxime ester compounds), sulfur-containing photo-polymerization initiators (e.g., sulfide and thioxanthone compounds), acylphosphine oxide photo-polymerization initiators, and the like. The photo-polymerization initiators may also be used in combination with photo-sensitizers such as amine sensitizers.

Illustrative, non-limiting, examples of the photo-polymerization initiator include 4-phenoxydichloroacetophenone, 4-t-butyl-dichloroacetophenone, 4-t-butyl-trichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-methylpropan-1-one, 1-{4(2-hydroxyethoxy)phenyl}-2-hydroxy-2-methylpropan-1-one, 1-hydroxycyclohexyl phenyl ketone, 2-methyl-1-{4-(methylthio)phenyl}-2-morpholinopropan-1-one, benzyl, benzoin, benzoin methyl ether, benzoin ethyl ether, benzoin isopropyl ether, benzoin isobutyl ether, benzyl dimethyl ketal, benzophenone, benzoylbenzoic acid, methyl benzoylbenzoate, 4-phenylbenzophenone, hydroxybenzophenone, acrylated benzophenone, 3,3'-dimethyl-4-methoxybenzophenone, 3,3',4,4'-tetra(t-butylperoxycarbonyl)benzophenone, 9,10-phenanthrene quinone, camphor quinone, dibenzosuberone, 2-ethylanthraquinone, 4',4"-diethylisophthalophenone, α-acyloxime ester, methyl phenylglyoxylate, 4-benzoyl-4'-methyldiphenyl sulfide, thioxanthone, 2-chlorothioxanthone, 2-methylthioxanthone, 2,4-dimethylthioxanthone, isopropylthioxanthone, 2,4-dichlorothioxanthone, 2,4-diethylthioxanthone, 2,4-diisopropylthioxanthone, 2,4,6-trimethylbenzoyldiphenylphosphine oxide, benzoyldiphenylphosphine oxide, 2,6-dimethylbenzoyldiphenylphosphine oxide, and bis(2,6-dimethoxybenzoyl)-2,4,4-trimethylpentylphosphine oxide.

An appropriate amount of the photo-polymerization initiator added is about 0.01 to 20 parts, more preferably about 0.1 to 5 parts by weight per 100 parts by weight of the silicone resin and the (meth)acrylate compound combined.

The coating composition of the invention is applicable to substrates of plastics, glass, ceramics and metals. Prior to the application of the inventive coating composition, various primers may be applied to substrates to improve the bond therebetween. Where the coating composition is applied for antireflection purposes, transparent substrates of plastics, glass and ceramics on which a high refractive index layer having a refractive index of at least 1.65 has been coated as a subbing layer may be used. Best results are obtained when the coating composition is applied to substrates of polycarbonates, poly(meth)acrylates, polyarylates, polyolefins, polyesters such as PET, and cellulose derivatives such as TAC.

After the coating composition is applied and cured, the cured coating preferably has a refractive index of up to 1.42, more preferably up to 1.40, and especially 1.35 to 1.40.

Another embodiment of the invention is an article having a cured coating of the coating composition on its surface as a protective coating. The coated article exhibits improved water repellency, oil repellency and antifouling property as well as antireflection property. The cured coating preferably has a thickness of 0.02 to 1 μm, and especially 0.05 to 0.5 μm although the coating thickness is not critical.

The antireflection article having a cured coating of the coating composition may include a high refractive index layer having a refractive index of at least 1.65 as the subbing layer (between the substrate and the cured coating) as mentioned above. The high refractive index layer is preferably comprised of a metal oxide sol of ZnO, $TiO_2$, $Sb_2O_5$, $Y_2O_3$, $La_2O_3$, $ZrO_2$, $Al_2O_3$ or ITO, or a combined oxide sol thereof.

In applying the coating composition to substrates, any desired techniques including dipping, spin coating, flow coating, roll coating, spray coating and screen printing may be used. The dipping, spray coating and roll coating techniques are preferred because of ease of control of the coating thickness.

The coating of the coating composition as applied to a substrate can be cured by any of well-known curing procedures. Typical is a procedure (1) of heating at a temperature below the deformation temperature of the substrate for inducing condensation of silanol groups. Where (meth) acrylic, mercapto, vinyl or epoxy groups are incorporated in organic substituent groups, a radiation curing procedure (2) utilizing ultraviolet radiation or electron beams is employable. A further procedure (3) utilizes ring-opening polymerization of epoxy groups. Where SiH and vinyl groups are included as the organic substituent groups, a crosslinking procedure (4) of effecting hydrosilylation reaction in the presence of a transition metal compound such as a platinum compound is employable.

For heat curing, the heating temperature is generally in the range of about 30 to 200° C., preferably about 60 to 120° C. and the drying time is generally in the range of about 1 to 120 minutes, preferably about 3 to 10 minutes. It is noted that the drying temperature or time can be reduced by adding a curing accelerator to the coating composition. Examples of the curing accelerator include organic tin compounds such as dibutyltin dilaurate, dibutyltin diacetate and octyltin trislaurate; and organic acid salts such as sodium acetate, sodium formate and potassium propionate. An appropriate amount of the curing accelerator added is about 0.001 to 1.0 part by weight per 100 parts by weight of the coating composition.

In the embodiment wherein curing is effected by exposure to UV radiation, a high-pressure mercury vapor lamp or metal halide lamp may be used as the light source. Usually, about 0.5 to 10 parts, preferably about 1 to 5 parts by weight of the photo-polymerization initiator is added to 100 parts by weight of the coating composition. This coating composition is applied to a substrate and exposed to UV radiation in a dose of about 200 to 1,200 mJ for curing.

In the embodiment of the coating composition wherein epoxy groups are incorporated in the organic substituent groups, curing can be effected using a metal complex compound as the curing catalyst. Usually about 1 to 10 parts by weight of a metal complex compound such as aluminum acetylacetonate or aluminum trisethylacetoacetonate is added to 100 parts by weight of the coating composition. This coating composition is applied to a substrate, which is heated at about 80 to 120° C. for about 30 to 120 minutes, obtaining a cured coating having a high hardness.

In the embodiment wherein SiH and vinyl groups are included in the organic substituent groups, hydrosilylation reaction is effected in the presence of a transition metal compound such as a platinum compound to induce crosslinking. Usually about 0.05 to 1.0 part by weight of a platinum catalyst such as PL-2 or PL-52 (Shin-Etsu Chemical Co., Ltd.) is added to 100 parts by weight of the coating composition. This coating composition is applied to a substrate, which is heated at about 100 to 120° C. for about 60 to 120 minutes to complete curing.

There has been described a coating composition capable of forming a coating having a high uniformity, a low refractive index, a high hardness and improved water repellent, oil repellent and antifouling properties. By applying the coating composition on a substrate subbed with a high refractive index layer, an antireflection article having an improved reflectance is obtainable. A coating featuring a high hardness and a low refractive index can be briefly formed at low temperatures, leading to a working advantage.

EXAMPLE

Examples of the invention are given below by way of illustration and not by way of limitation.

Example 1

A flask was charged with 1,200 g of trifluoropropyltrimethoxysilane, 300 g of heptadecafluorodecyltrimethoxysilane, 500 g of tetraethoxysilane, 200 g of isobutanol and 6 g of aluminum acetylacetonate. With stirring, 500 g of 0.25N acetic acid in water was slowly added dropwise. After the completion of dropwise addition, stirring was continued for a further 3 hours at room temperature. Thereafter, 600 g of diacetone alcohol and 3 g of a silicone leveling agent were added to the reaction mixture, obtaining a coating composition (1).

Example 2

A flask was charged with 1,600 g of trifluoropropyltrimethoxysilane, 400 g of heptadecafluorodecyltrimethoxysilane, 500 g of tetraethoxysilane, and 200 g of isobutyl alcohol. With stirring, 600 g of 0.25N acetic acid in water was slowly added dropwise. After the completion of dropwise addition, stirring was continued for a further 3 hours at room temperature. Then 6 g of aluminum acetylacetonate was added to the mixture, which was stirred for 3 hours. Thereafter, 600 g of diacetone alcohol and 3 g of a silicone leveling agent were added to the reaction mixture, obtaining a coating composition (2).

Example 3

A flask was charged with 300 g of γ-acryloxypropyltrimethoxysilane, 100 g of γ-acryloxypropylmethyldimethoxysilane, 800 g of trifluoropropyltrimethoxysilane, 400 g of heptadecafluorodecyltrimethoxysilane, 800 g of tetraethoxysilane, and 200 g of isobutanol. With stirring, 600 g of 0.25N acetic acid in water was slowly added dropwise. After the completion of dropwise addition, stirring was continued for a further 3 hours at room temperature. Then 6 g of aluminum acetylacetonate was added to the mixture, which was stirred for 3 hours. Thereafter, 600 g of diacetone alcohol and 3 g of a silicone leveling agent were added to the reaction mixture, obtaining a coating composition (3).

Example 4

A flask was charged with 800 g of γ-glycidoxypropyltrimethoxysilane, 800 g of trifluoropropyltrimethoxysilane, 400 g of heptadecafluorodecyltrimethoxysilane, and 200 g of isobutanol. With stirring, 419 g of 0.25N acetic acid in water was slowly added dropwise. After the completion of dropwise addition, stirring was continued for a further 3 hours at room temperature. Then 6 g of aluminum acetylacetonate was added to the mixture, which was stirred for 3 hours. Thereafter, 600 g of diacetone alcohol and 3 g of a silicone leveling agent were added to the reaction mixture, obtaining a coating composition (4).

Example 5

A flask was charged with 1,200 g of trifluoropropyltrimethoxysilane, 300 g of heptadecafluorodecyltrimethoxysilane, 500 g of methyltriethoxysilane, and 200 g of isobutanol. With stirring, 475 g of 0.25N acetic acid in water was slowly added dropwise. After the completion of dropwise addition, stirring was continued for a further 3 hours at room temperature. Then 6 g of aluminum acetylacetonate was added to the mixture, which was stirred for 3 hours. Thereafter, 600 g of diacetone alcohol and 3 g of a silicone leveling agent were added to the reaction mixture, obtaining a coating composition (5).

Example 6

A flask was charged with 1,200 g of trifluoropropyltrimethoxysilane, 400 g of heptadecafluorodecyltrimethoxysilane, 200 g of isobutanol, and 6 g of aluminum acetylacetonate. With stirring, 320 g of 0.25N acetic acid in water was slowly added dropwise. After the completion of dropwise addition, stirring was continued for a further 3 hours at room temperature. Then 800 g of tetraethoxysilane was added to the hydrolyzate, and 300 g of 0.25N acetic acid in water was slowly added dropwise. After the completion of dropwise addition, stirring was continued for a further 3 hours at room temperature. Thereafter, 600 g of diacetone alcohol and 3 g of a silicone leveling agent were added to the reaction mixture, obtaining a coating composition (6).

Comparative Example 1

A flask was charged with 300 g of γ-acryloxypropyltrimethoxysilane, 100 g of γ-acryloxypropylmethyldimethoxysilane, 400 g of heptadecafluorodecyltrimethoxysilane, 800 g of tetraethoxysilane, and 200 g of isobutanol. With stirring, 400 g of 0.25N acetic acid in water was slowly added dropwise. After the completion of dropwise addition, stirring was continued for a further 3 hours at room temperature. Thereafter, 600 g of diacetone alcohol and 3 g of a silicone leveling agent were added to the reaction mixture, obtaining a coating composition (7).

Comparative Example 2

A flask was charged with 400 g of heptadecafluorodecyltrimethoxysilane, 800 g of tetraethoxysilane, and 200 g of isobutanol. With stirring, 315 g of 0.25N acetic acid in water was slowly added dropwise. After the completion of dropwise addition, stirring was continued for a further 3 hours at room temperature. Thereafter, 600 g of diacetone alcohol and 3 g of a silicone leveling agent were added to the reaction mixture, obtaining a coating composition (8).

Formation of Cured Coatings

Coating solutions were prepared by adding 0.4 part by weight of sodium formate (1% water/alcohol solution) to 100 parts by weight of the inventive coating compositions (1), (2), (4), (5) and (6) of Examples 1, 2, 4, 5 and 6 and the comparative coating compositions (7) and (8) of Comparative Examples 1 and 2. Each of the coating solutions was applied to the surface of a transparent substrate of glass (3.0 mm thick) by dipping. In a hot air circulation oven, the coating was died at 80° C. for 3 minutes, forming a cured coating of 0.1 μm thick.

Separately, another coating solution was prepared by adding 5 parts by weight of phenyl-2-hydroxy-2-propylketone as a photo-polymerization initiator to 100 parts by weight of the inventive coating composition (3) of Example 3. Using the wire bar of Bar Coater NO-6, the coating solution was applied to the surface of a transparent substrate of glass (3.0 mm thick) and then air dried for 15 minutes. Using a UV curing system equipped with a high-pressure mercury lamp, the coating was irradiated with UV in a dose of 600 mJ. This resulted in a cured coating of 0.1 μm thick.

Evaluation of Cured Coatings

Each of the cured coatings on the surface of transparent substrates was measured for pencil hardness and refractive index and examined for substrate adhesion, weather resistance, transparency, antireflection and storage stability. The results are shown in Table 1. It is noted that substrate adhesion, weather resistance, transparency and antireflection each were rated "OK", "Fair," or "NG" for excellent, fair or rejected property. The hardness, refractive index and storage stability was examined and rated as follows.

Pencil hardness:

Measured according to JIS K5400.

Refractive index:

A film was formed to a thickness of 30 to 50 μm, and its refractive index was measured by an Abbe refractometer at a temperature of 25° C.

Storage stability:

Each of the inventive coating compositions (1) to (6) of Examples 1 to 6 and comparative coating compositions (7) and (8) of Comparative Examples 1 and 2 was diluted to a concentration of 10%. The coating composition solution was held in a glass container at 40° C. for 2 months whereupon the solution was visually inspected for anomalous changes such as agglomerates and coloring. Samples were rated "OK" in the absence of anomaly and "NG" in the presence of anomaly.

TABLE 1

|  | Example |  |  |  |  |  | Comparative Example |  |
|---|---|---|---|---|---|---|---|---|
|  | 1 | 2 | 3 | 4 | 5 | 6 | 1 | 2 |
| Coating composition | (1) | (2) | (3) | (4) | (5) | (6) | (7) | (8) |
| Pencil hardness | H | H | F | 2H | 2H | H | B | B |
| Refractive index | 1.385 | 1.380 | 1.415 | 1.400 | 1.390 | 1.395 | 1.450 | 1.460 |
| Weather resistance | OK | OK | Fair | OK | OK | OK | Fair | Fair |
| Adhesion | OK | OK | OK | OK | OK | OK | NG | NG |

TABLE 1-continued

|  | Example | | | | | | Comparative Example | |
|---|---|---|---|---|---|---|---|---|
|  | 1 | 2 | 3 | 4 | 5 | 6 | 1 | 2 |
| Transparency | OK | OK | OK | OK | OK | OK | NG | NG |
| Antireflection | OK | OK | OK | OK | OK | OK | NG | NG |
| Storage stability | OK | OK | OK | Fair | OK | OK | NG | NG |

Japanese Patent Application No. 2000-237419 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A coating composition comprising a silicone resin having at least two types of fluorinated organic substituent groups represented by the following average compositional formula (1):

   (1)

wherein $R^1$ and $R^2$ are different monovalent fluorinated organic groups of 3 to 30 carbon atoms, $R^3$ is hydrogen or a monovalent organic group of 1 to 10 carbon atoms, X is OH or a monovalent hydrolyzable group, m, n, p and q are numbers satisfying $0<m<1$, $0<n<1$, $0\leq p<1$, $0<q<1.8$, $0<m+n\leq 1$, and $0<m+n+p+q\leq 3$ which cures at a temperature of 30 to 200° C.

2. The coating composition of claim 1 wherein in formula (1), $R^1$ is 3,3,3-trifluoropropyl.

3. The coating composition of claim 1 wherein in formula (1), $R^3$ is 3-acryloxypropyl or 3-methacryloxypropyl.

4. The coating composition of claim 1 wherein said silicone resin is obtained by hydrolysis or hydrolysis and partial condensation of a mixture of components (1) to (3):

(1) 100 parts by weight of a fluorinated silane compound of the following formula:

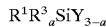

or a (partial) hydrolyzate or condensate thereof, (2) 1 to 1,000 parts by weight of a fluorinated silane compound of the following formula:

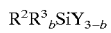

or a (partial) hydrolyzate or condensate thereof, and (3) 0 to 1,000 parts by weight of a fluorine-free silane compound of the following formula:

or a (partial) hydrolyzate or condensate thereof, wherein $R^1$, $R^2$ and $R^3$ are as defined above, Y is OH or a monovalent hydrolyzable group, "a" is a number from 0 to 2, "b" is a number from 0 to 2, and "c" is a number from 0 to 3.

5. The coating composition of claim 4 wherein said silicone resin is obtained by subjecting a mixture of components (1) to (3) to hydrolysis in the presence of an acidic compound as a hydrolytic catalyst, and adding a metal compound to the hydrolyzed mixture, followed by further hydrolysis or hydrolytic condensation.

6. The coating composition of claim 4 wherein said silicone resin is obtained by mixing components (1) and (2) with a metal compound, subjecting the mixture to hydrolysis in the presence of an acidic compound, and adding component (3) to the hydrolyzed mixture, followed by further hydrolysis or hydrolytic condensation.

7. The coating composition of claim 4 wherein said silicone resin is obtained by mixing components (1) to (3) with a metal compound, adding water containing an acidic compound to the mixture, and effecting hydrolysis.

8. The coating composition of claim 4 wherein component (3) is a methyltrialkoxysilane or a tetraalkoxysilane or a mixture thereof.

9. The coating composition of claim 4 wherein component (3) is a 3-(meth)acryloxypropyltrialkoxysilane or a 3-(meth)acryloxypropylmethyldialkoxysilane or a mixture thereof.

10. The coating composition of claim 1 which cures into a coating having a refractive index of up to 1.42.

11. An article having a protective coating with improved water repellency, oil repellency and antifouling property, said protective coating being a cured coating of the coating composition of claim 1.

12. An antireflection article having a cured coating of the coating composition of claim 1 on its surface.

13. The article of claim 12 further comprising a high refractive index layer having a refractive index of at least 1.65 between the surface of the article and the cured coating.

14. The article of claim 13 wherein the high refractive index layer contains a metal oxide sol.

15. A coating composition comprising a silicone resin having at least two types of fluorinated organic substituent groups, represented by the following average compositional formula (1):

   (1)

wherein $R^1$ and $R^2$ are different monovalent fluorinated organic groups of 3 to 30 carbon atoms, $R^3$ is hydrogen or a monovalent organic group of 1 to 10 carbon atoms, X is OH or a monovalent hydrolyzable group, m, n, p and q are numbers satisfying $0<m<1$, $0<n<1$, $0\leq p<1$, $0<q<1.8$, $0<m+n\leq 1$, and $0<m+n+p+q\leq 3$, said silicone resin being obtained by subjecting a mixture of components (1) to (3) to hydrolysis:

(1) 100 parts by weight of a fluorinated silane compound of the following formula:

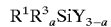

or a (partial) hydrolyzate or condensate thereof, (2) 1 to 1,000 parts by weight of a fluorinated silane compound of the following formula:

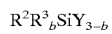

or a (partial) hydrolyzate or condensate thereof, and (3) 0 to 1,000 parts by weight of a fluorine-free silane compound of the following formula:

or a (partial) hydrolyzate or condensate thereof, wherein $R^1$, $R^2$ and $R^3$ are as defined above, Y is OH or a monovalent hydrolyzable group, "a" is a number from 0 to 2, "b" is a number from 0 to 2, and "c" is a number from 0 to 3, in the presence of an acidic compound as a hydrolytic catalyst, and adding a catalytic amount of aluminum trisacetylacetonate to the hydrolyzed mixture, followed by further hydrolysis or hydrolytic condensation.

16. The coating composition of claim 1 or 15 wherein in formula (1), $R^1$ is 3,3,3-trifluoropropyl, $R^2$ is $Rf(CH_2)_rZ(CH_2)_s$—wherein Rf is $C_xF_{2x+1}$ or

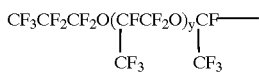

x is an integer of 1 to 20, y is an integer of 1 to 20, z is one or more linking groups selected from among —$CH_2$—, —$CH_2O$—, —NR—, —COO—, —CONR—, —S—, —$SO_3$— or —$SO_2NR$—, R is hydrogen or an alkyl group of 1 to 8 carbon atoms, the letter r is an integer of 0 to 3 and s is an integer of 1 to 3 with proviso that $R^2$ is not 3,3,3-trifluoropropyl, and $R^3$ is 3-acryloxypropyl or 3-methacryloxypropyl.

17. The article of claim 12, wherein said cured coating has a refractive index of up to 1.42.

18. The article of claim 12, wherein said cured coating has a refractive index of up to 1.35 to 1.40.

19. The coating composition of claim 1, which is capable of curing into a coating having a refractive index of up to 1.42 by curing and drying said coating at a temperature of 30 to 200° C. for 1 to 120 minutes.

20. The coating composition of claim 1, which is capable of curing into a coating having a refractive index of 1.35 to 1.40 by curing and drying said coating at a temperature of 30 to 200° C. for 1 to 120 minutes.

21. The coating composition of claim 1, which is capable of curing into a coating having a refractive index of 1.35 to 1.40 by curing and drying said coating at a temperature of 30 to 200° C. for 3 to 10 minutes.

\* \* \* \* \*